US008849770B2

(12) United States Patent
Bacinschi et al.

(10) Patent No.: US 8,849,770 B2
(45) Date of Patent: Sep. 30, 2014

(54) EVENT AUDITING FRAMEWORK

(75) Inventors: Radim Bacinschi, Vancouver (CA); Greg McClement, Maple Ridge (CA); Peter Tippett, Vancouver (CA)

(73) Assignee: Business Objects Software Limited, Dublin (IE)

( * ) Notice: Subject to any disclaimer, the term of this patent is extended or adjusted under 35 U.S.C. 154(b) by 570 days.

(21) Appl. No.: 13/108,171

(22) Filed: May 16, 2011

(65) Prior Publication Data

US 2012/0296876 A1 Nov. 22, 2012

(51) Int. Cl.
| | |
|---|---|
| G06F 17/00 | (2006.01) |
| G06F 11/30 | (2006.01) |
| G06F 17/30 | (2006.01) |
| G06F 21/60 | (2013.01) |
| H04L 29/06 | (2006.01) |
| G06F 21/55 | (2013.01) |
| G06F 21/62 | (2013.01) |

(52) U.S. Cl.
CPC ............ *G06F 17/30* (2013.01); *G06F 11/3006* (2013.01); *G06F 21/604* (2013.01); *H04L 63/101* (2013.01); *G06F 21/552* (2013.01); *G06F 11/3075* (2013.01); *H01L 63/12* (2013.01); *G06F 21/629* (2013.01)
USPC .......................................... 707/687; 707/792

(58) Field of Classification Search
None
See application file for complete search history.

(56) References Cited

U.S. PATENT DOCUMENTS

| | | | |
|---|---|---|---|
| 6,725,240 B1* | 4/2004 | Asad et al. .............................. 1/1 |
| 2006/0200444 A1* | 9/2006 | Bracho et al. ...................... 707/1 |
| 2007/0112871 A1* | 5/2007 | Mulagund et al. ............. 707/200 |
| 2008/0244741 A1* | 10/2008 | Gustafson et al. .............. 726/23 |

OTHER PUBLICATIONS

SAP, 2010, "SAP BusinessObjects Enterprise Administrator's Guide, SAP BusinessObjects Enterprise XI 3.1 Service Pack 3", Created May 7, 2010, Posted May 2010, pp. 577-612, URL: http://help.sap.com/businessobject/product_guides/boexir31SP3/en/xi31_sp3_bip_admin_en.pdf.
SAP, 2011, "Business Intelligence Platform Administrator Guide, SAP BusinessObjects Business Intelligence platform 4.0" Created Mar. 28, 2011, Posted 4.0, pp. 521 et seq., URL: http://help.sap.com/businessobject/product_guides/boexir4/en/xi4_bip_admin_en.pdf.

* cited by examiner

*Primary Examiner* — Wilson Lee

(57) ABSTRACT

Various embodiments of systems and methods for event auditing framework are described herein. The auditing framework includes one or more auditees, an auditor, and a memory associated with the auditor. Each auditee is associated with a digitally signed file including metadata of one or more events authorized for the auditee. The auditor validates digital signature of the file when the auditee is registered with the auditor. After validation of the digital signature, the metadata of the authorized events is stored with respect to the auditee to enable the auditee perform the authorized events. The auditing framework is expandable in that new event types can be added or updated dynamically. The auditing framework also ensures consistency of events.

24 Claims, 8 Drawing Sheets

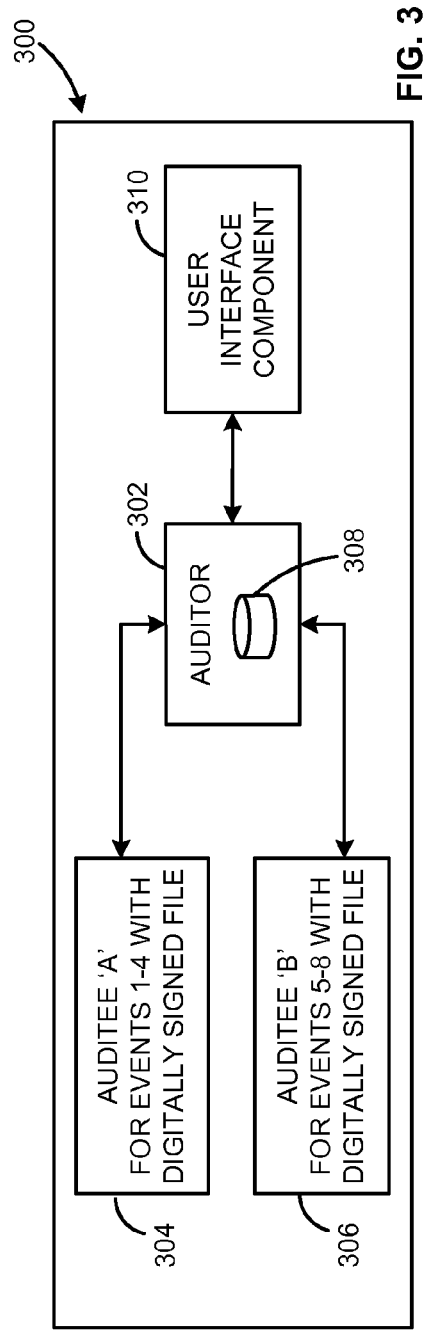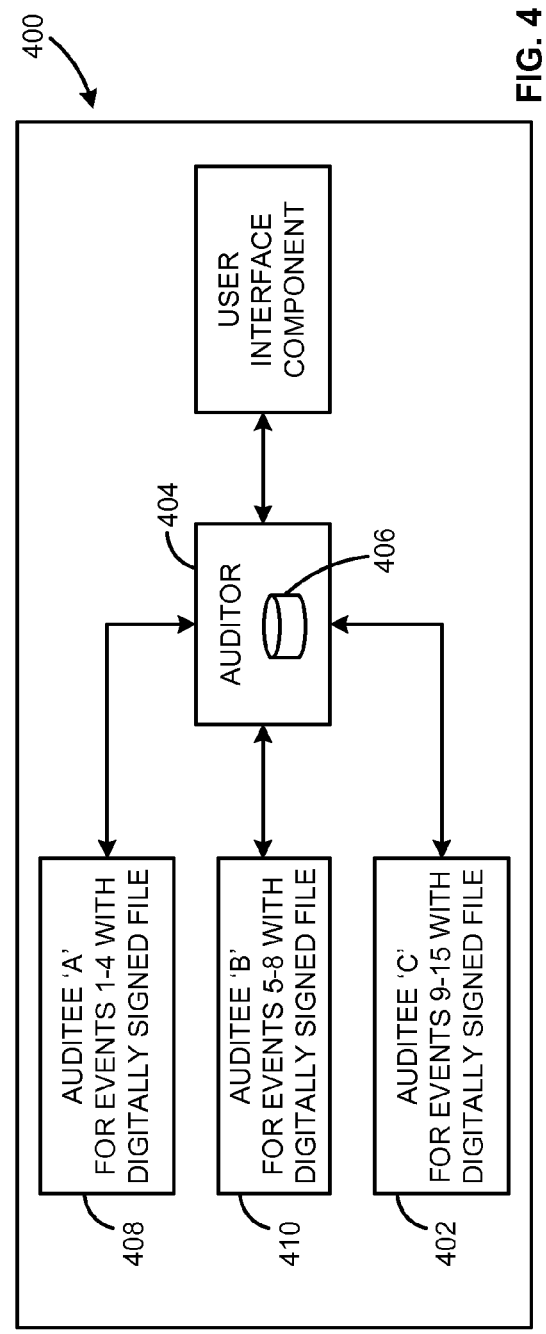

EVENT AUDITING FRAMEWORK

FIELD

The field relates generally to auditing systems. More particularly, the field relates to an event auditing framework for information technology (IT) systems.

BACKGROUND

Information Technology (IT) systems are widely used. There are several types of IT systems such as, for example, systems related to organizational functions and analytical application systems. Several operations can be performed in an IT system and different users use the system in different ways. Information about usage of an IT system may be required for various purposes such as compliance requirements. The system usage information may also be required for user profiling, which can be utilized to provide users with information that is relevant and is of interest to them. Tracking usage of an IT system is therefore a useful and important activity.

A common solution to track usage of an IT system is by creating log files. However, data in the log files is usually inconsistent and not flexible enough for reporting. For example, a large number of components may write to a log file. Each component may log a different message for the same event or action. For example, a first component may write "At 11:29:03 a document 'Quarterly Sales' was retrieved by user U1," a second component may write "Report R1.rpt viewed," and a third component may write "User U2 accessed sales.pdf". These events may have the same meaning, i.e., a user had accessed a particular piece of information, namely, accessing a Quarter 1 sales report. However, it is not clear from the corresponding log files that these events are same. Also, some components may not write the details about time at which the operation is performed or the user who performed the operation. There is no consistency in the way components write to a log file.

Some types of event logging frameworks allow slightly more structural data. For example, time, user, and process name can be always recorded. However, the content of the logged message can still be difficult to interpret and consistency of the message cannot be ensured. The data in the log files may not be readily useful for reporting purposes. Some usage tracking frameworks format event data and store in a database. This stored event data can be used for reporting. However, such event tracking frameworks are not expandable in that new events can only be added in a new version of the framework. Also, the consistency of events cannot be ensured. Some expandable systems may allow addition of new events. However, in such expandable systems, it is difficult to enforce consistency of events generated by each of the several components.

It would therefore be desirable to provide an expandable auditing system that ensures consistency of events so that data can be readily consumed for reporting purposes.

SUMMARY

Various embodiments of systems and methods for event auditing framework are described herein. The auditing framework includes one or more auditees, an auditor, and a memory associated with the auditor. Each auditee is associated with a digitally signed file including metadata of one or more events authorized for the auditee. An auditee is a component of an IT system which generates auditing events. The auditee generates auditing events according to metadata defined in the digitally signed file which defines the events that the auditee can generate. The auditor validates digital signature of the file when the auditee is registered with the auditor. After validation of the digital signature, the metadata of the authorized events is stored with respect to the auditee to enable the auditee perform the authorized events. The auditing framework is expandable in that new event types can be added or updated dynamically (even after a release). The auditing framework also ensures consistency of events which in turn ensures ease of reporting and data consumption.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 3 is a block diagram of an event auditing framework for a set of events, according to one embodiment.

FIG. 4 is a block diagram of the event auditing framework that is expanded to include a new set of events, according to one embodiment.

DETAILED DESCRIPTION

Figure 1:
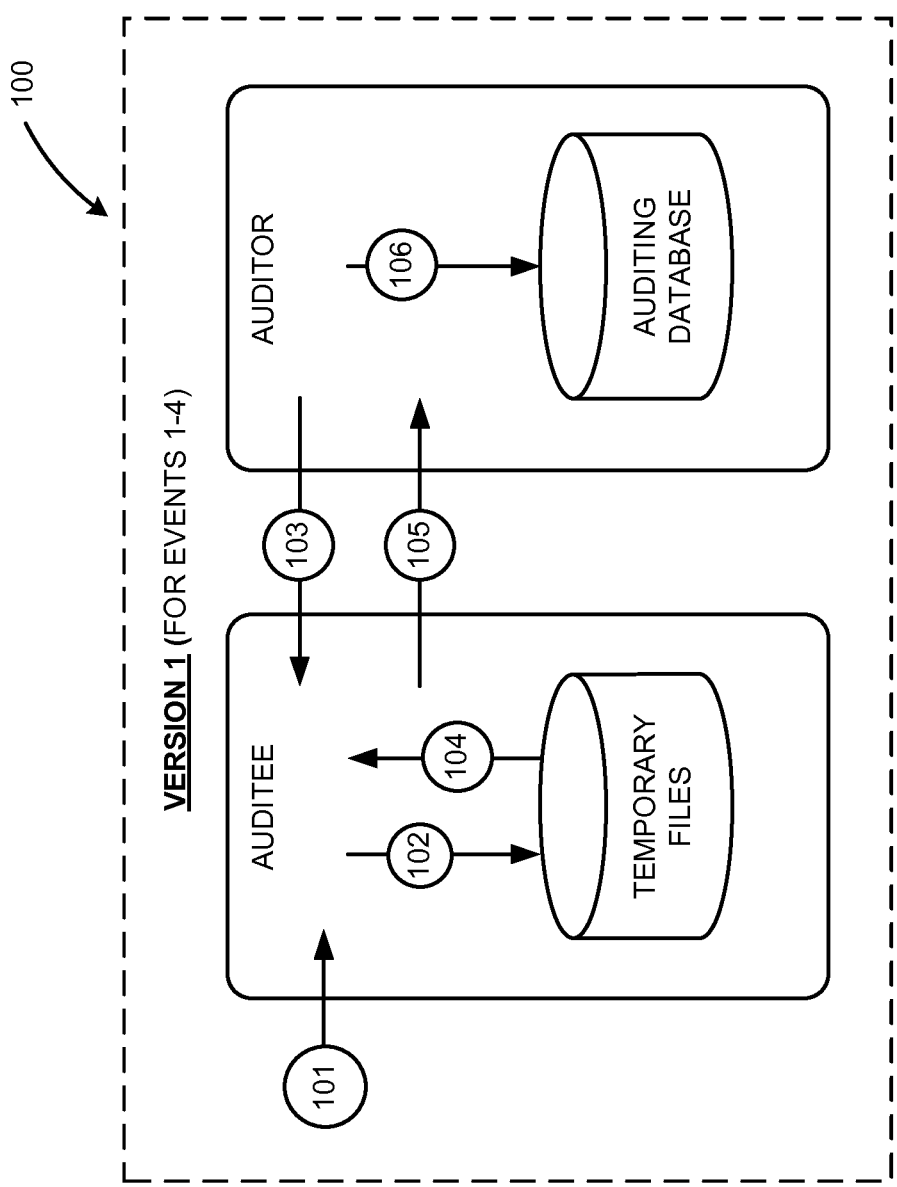
FIG. 1 is a block diagram illustrating an example of an auditing workflow for a set of events.

Embodiments of techniques for event auditing framework are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Auditing is a function for maintaining a record of significant events performed in an IT system. These significant events vary depending on the type of the system and are referred to as auditable events. An example of an IT system is a Business Intelligence (BI) system. Business Intelligence broadly refers to a category of software systems and applications used by business enterprises to query, analyze, report, and leverage data. SAP® BusinessObjects™ Business Intelligence platform from the software firm SAP AG of Walldorf, Germany, is one such BI system. BusinessObjects™ Business Intelligence platform delivers a scalable and adaptive services-oriented architecture.

The records of auditable events that are maintained in an IT system should be able to provide a picture of what information is accessed, how the information is accessed, when the information is accessed, and who accessed the information. The records can also be used to track system configuration, changes to information, modification, deletion, editing, etc. Two main components are used for auditing, namely, an auditor and an auditee. An auditor refers to a system that is responsible for recording or storing information on any auditable event. An auditee refers to a system that is responsible for generating auditing events. In one embodiment, a single system can be both an auditor and an auditee. In the case of BusinessObjects™ Enterprise, a Central Management Server (CMS) acts as the system auditor and each BusinessObjects Enterprise server acts as an auditee. In another embodiment, an auditor and an auditee can be separate systems.

An auditor is responsible for collecting and writing the events to an auditing database. When an auditee has been requested to perform an operation that has to be audited, the auditee will generate an auditing event record and store it in a local temporary file. At regular intervals the auditor communicates with the auditee servers to request copies of records from their local temporary files. When the auditor receives these records, it writes the data to the auditing database. The auditor can also control the synchronization of auditing events that occur on different machines. Each auditee provides a time stamp for the auditing events that it records. To ensure that the time stamps of events on different servers are consistent, the auditor periodically broadcasts its system time to the auditees. The auditees then compare this time to their internal clocks. If differences exist, the auditees make a correction to the time they record for subsequent auditing events.

Several workflows to record the auditable events are used based on the type of client being audited. FIG. 1 illustrates an example of a workflow of an auditing system 100. An auditable event is performed by a server at step 101. The auditee writes the auditable events in a temporary file at step 102. At step 103, the auditor polls the auditee periodically and requests a batch of auditable events that are written in the temporary file. In one embodiment, the auditor periodically polls the auditee for every three minutes or other prescribed time period. The auditee retrieves auditing events from the temporary files at step 104. The auditee then transmits the auditable events to the auditor at step 105. At step 106, the auditor writes events to the auditing database. The auditee deletes the files from temporary files only after confirmation from the auditor that the events were successfully written to the auditing database.

For an IT system such as a BI platform, a list of auditable events is provided along with the release of the platform. The type of the events can vary depending on the IT system. In the context of a BI system, examples of events include View, Edit, Refresh, Modify, Run, Logon, Deliver, Logout, and Trigger events. This list of events is not exhaustive and there can be several other types of events depending on the IT system.

Figure 2:
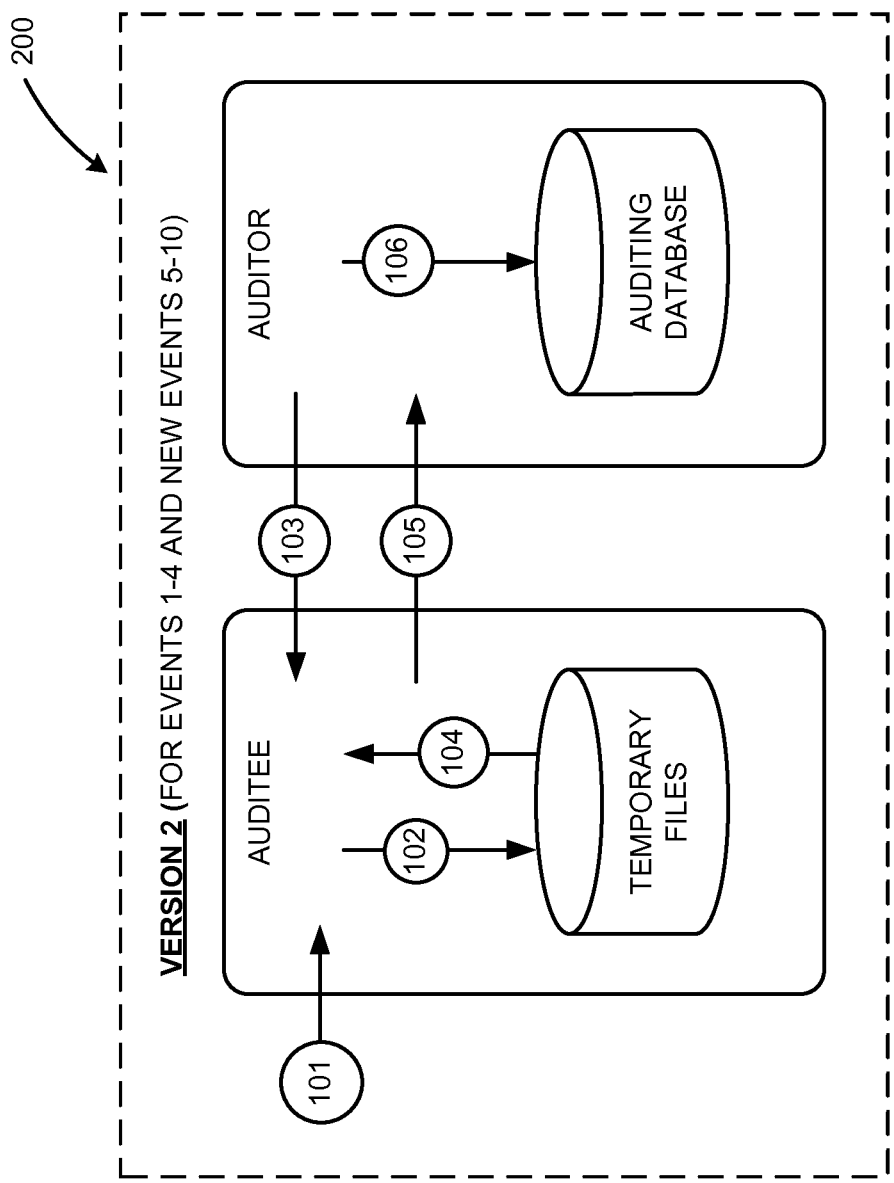
FIG. 2 is a block diagram illustrating an example of an auditing workflow for new set of events.

The auditing process records and stores only the events that are part of the list that is provided at the time of the release of a platform. New events can be included for auditing only in a new version of the platform that is released at a later time. For example, referring to FIG. 1, auditable events 1-4 are included in a "Version 1" of an auditing platform 100 or a BI platform. Therefore, events 1-4 can be audited in "Version 1" of the auditing platform 100. Referring to FIG. 2, if new events have to be added for auditing, it can only be possible by including the new events in a new version (Version 2) release of the auditing platform 200 or a BI platform. For example, new events 5-10 are included in a "Version 2" of the auditing platform 200. Events 1-10 can then be audited in "Version 2" of the auditing platform 200. Also, while adding the new events in a new version, consistency about the event details that have to be recorded may not be ensured. The event auditing framework as described below allows dynamic addition of new events even after release and ensures consistency of events.

FIG. 3 illustrates an embodiment of an event auditing framework 300. The event auditing framework 300 comprises an auditor 302 and one or more auditees 304 and 306. The auditor 302 can be any system or a component that is responsible for recording or storing information on any auditable event. The auditees 304 and 306 can be any components that are responsible for performing an event that is audited. In one embodiment, both the auditor and the auditees can be in a single system. Each auditee 304 and 306 is created for one or more authorized events. Each auditee 304 and 306 includes a digitally signed file. The digitally signed file includes metadata of the events or a definition of the events that are authorized for the auditee. For example, if the events 1 to 4 are authorized for the auditee 'A', the digitally signed file includes metadata of the events 1-4. Similarly, if the events 5 to 8 are authorized for the auditee 'B', the digitally signed file includes metadata of the events 5-8. The metadata also includes details of the authorized events. The details include definitions of the events.

In one embodiment, the digitally signed file is a Default InfoObject (DFO) file or Default InfoObject template (DFT) file with a digital signature. A DFO or DFT file is a text file containing an XML description of a metadata object, which can be called as an InfoObject. The metadata objects comprise name-value pairs that allow certain property types and allow nested property bags. The metadata objects can represent something concrete such as a user, server, or application, or something abstract such as an "Audit Event Information" object. An example of DFO file with a digital signature is presented below.

```
<?xml version="1.0" encoding="UTF-8" standalone="no"?>
<plugin xmlns="http://www.businessobjects.com/BusinessObjects_pin.xsd">
    <propertybag flags="0" name="CrystalEnterprise.BIP.CafApplication"
type="Infoobject">
```

```
    <property flags="0" name="SI_KIND"
type="String">BIP.CafApplication</property>
    <property flags="0" name="SI_PROGID"
type="String">CrystalEnterprise.BIP.CafApplication</property>
    <property flags="0" name="SI_NAME" type="String">InfoView</property>
    <property flags="0" name="SI_PARENT_CUID"
type="String">AR1Zth00HO5Bp8N4HfboAYg</property>
    <property flags="0" name="SI_CUID"
type="String">Af9fX5We.TVJu_6eVqnxufQ</property>
    <property flags="0" name="SI_APPLICATION_OBJECT"
type="Bool">True</property>
  </propertybag>
  <propertybag name="SI_SUPPORTED_AUDIT_EVENTS" type="Array"
flags="0">
    <property name="SI_TOTAL" type="Long" flags="0">1</property>
    <property name="1" type="Long" flags="0">1002</property>
  <property name="SI_AUDITING_SIGNATURE" type="String"
flags="0">cmdmAEapw3tGwi0/UnS2d2wzjoEk1kc107dS+HVhWHQrbYPCgzQBEmCq
r7Zc37QaZewB61AlNRpAXOUSIfEjoY7N3iuNdxPdBAUUFlhGE9j4PMJf/DT+JZdfsQ
M1xDavWvk1lptIk4rGMypoR3A9/QDd+ogDE/bB+mWT7T/w5334d4QXqvYgbuQLnV
n8O+l0I7IbvF95Z9qtDzN5beeJUTgfDuA2e9eUi6ilHcbA5T8FMTkbaMkD2UxdcLhvDx
qgfmlr9HyShQvgM6YatfwjLQxxYOt/GZ8GffDbLt00nBYqQ/1BWX9aool2iBsmt51hQ
LaCHwI1lPuT2GChAzK7uw</property>
  </propertybag>
</plugin>
```

The above DFO file shows that that "Infoview" auditee (shown in bold) is only allowed to fire the event "1002" (shown in bold). The DFO file is also signed (SI_AUDITING_SIGNATURE).

An example of a data structure used to define the events in the file is explained below. Each event can contain a number of details with property and value pairs. The data is defined in such a way that the events and the event details can be extended even after the release of the framework. An object repository contains an object that describes the events that can be generated by the auditing framework. The below data structure example is given in Extensible Markup Language (XML).

Arrays have the following format:

```
<array name="AUDIT_EVENTS">
  <!-- Array Element Number 1 -->
  <arrayelement index="1">
  </arrayelement>
</array>
```

Property/value pairs have the following format:
<property name="PropertyName" type="Type">PropertyValue</property>
Groups of properties have the following format:

```
<propertybag name="PropertyGroupName">
  <property name...>
  ...
</propertybag>
```

An "AUDIT_EVENTS" array contains definitions of each type of audit event. This array is presented below:

```
<array name="AUDIT_EVENTS">
  <arrayelement index="1">
    <property name="ID" type="Long">1000</property>
    <property name="DESCRIPTION" type="String">View</property>
    <array name="STATUSES">
      <arrayelement name="1" type="Bag">
        <property name="STATUS" type="Long">0</property>
        <property name="DESCRIPTION" type="String">Viewed Successfully</property>
      </arrayelement>
      <arrayelement name="2" type="Bag">
        <property name="STATUS" type="Long">1</property>
        <property name="DESCRIPTION" type="String">View Failed</property>
      </arrayelement>
      <property name="TOTAL" type="Long">2</property>
    </array>
    <property name="AUDIT_LEVEL" type="Long">3</property>
    <property name="AUDIT_CATEGORY" type="Long">1</property>
    <propertybag name="SUPPORTED_EVENT_DETAILS" type="Bag">
      <property name="1" type="Long">1</property>
      <property name="2" type="Long">2</property>
      <property name="3" type="Long">3</property>
      ...
      <property name="24" type="Long">72</property>
      <property name="25" type="Long">73</property>
      <property name="26" type="Long">74</property>
      <property name="TOTAL" type="Long">26</property>
    </propertybag>
    <propertybag name="MANDATORY_EVENT_DETAILS" type="Bag">
      <property name="1" type="Long">17</property>
      <property name="TOTAL" type="Long">1</property>
    </propertybag>
  </arrayelement>
</array>
```

The above array defines event "1000." The event "1000" is named as "View." For each event there can be a status indicating the result of the action that is being audited. The "STATUSES" array contains a mapping of result code to description of the result code. Auditees are permitted to generate events only with statuses which appear in the STATUSES list. AUDIT_LEVEL identifies the level that the event is found in. "SUPPORTED_EVENT_DETAILS" is an array that contains the ID (identification) numbers (e.g., 1, 2, 3 . . . 72, 73, 74) of the event details that may be provided for the event "1000." "MANDATORY_EVENT_DETAILS" array contains a list of the event details (with IDs, e.g., 17) that must be provided whenever the event "1000" is generated.

An "AUDIT_EVENT_DETAILS" array can be used to define the details that may be associated with events, as shown below:

```
array name="AUDIT_EVENT_DETAILS" type="Array">
    <arrayelement name="1">
        <property name="ID" type="Long">1</property>
        <property name="DESCRIPTION"
        type="String">Error</property>
    </arrayelement>
</array>
```

The above array defines an event detail with the ID number '1.' The name of the detail is "Error." The ID numbers in this array appear in the "SUPPORTED_EVENT_DETAIL" and/or "MANDATORY_EVENT_DETAILS" arrays in the event object definition, i.e. in the "AUDIT_EVENTS" array.

A memory 308 is associated with the auditor 302. In one embodiment, the memory 308 is an auditing database. For the auditee 'A' 304 to perform the events 1-4, the auditee 'A' 304 first connects to the auditor 302 and is registered with the auditor 302. The auditee 'A' 304 provides its digitally signed event definition, i.e., event metadata, to the auditor 302. Specifically, during registration with the auditor, the auditee sends the digitally signed file with its supported events metadata to the auditor. The digitally signed event metadata describes which events the auditee 'A' 304 can generate and what is the structure of those events. The auditor 302 then validates the digital signature of the auditee 'A' 304 and confirms the identity of the auditee 'A' 304. If the digital signature is validated, the metadata of the events 1-4 is stored in the auditor 302. The auditee 'A' 304 can then generate the events 1-4. When any of the events 1-4 are triggered, the auditee 'A' 304 generates a record to ensure that it matches approved metadata and, if the event is valid, the auditee stores the record in a local temporary file. If the event is invalid, the event is discarded to ensure consistency of events in the database. Similarly, for the auditee 'B' 306 to perform the events 5-8, the auditee 'B' 306 first connects to the auditor 302 and is registered with the auditor 302. The auditee 'B' 306 provides its digitally signed event metadata to the auditor 302. The digitally signed event metadata describes which events the auditee 'B' 306 can generate and what is the structure of those events. The auditor 302 validates the digital signature of the auditee 'B' 306. The metadata of the events 5-8 is stored in the auditing database 308 after validating the digital signature. When any of the events 5-8 are triggered, the auditee 'B' 306 generates a record and stores in a local temporary file. The auditor 302 communicates with the auditee 'A' 304 and auditee 'B' 306 to request copies of records from their local temporary files. The auditor 302 receives the records of the events and writes them to the auditing database 308 after validation against digitally signed event metadata (which was provided when the auditee 'B' 306 first registered). A user interface component 310 is provided to configure the auditing framework 300 and to display the authorized events. The user interface component 310 is explained in reference to FIGS. 6 and 7.

Referring to FIG. 4, the event auditing framework 400 can be expanded to include new events, for example, events 9-15. There is no need to wait for a new version of the framework to include new events. A new auditee "Auditee C" 402 can be created to perform the events 9-15. The events 9-15 are defined in the auditee 'C' 402. The auditee 'C' 402 also includes a digitally signed file (e.g., a DFO file) that includes metadata of the events 9-15, i.e., details of the events 9-15. The auditee 'C' 402 can be shipped and registered with the auditor 404. The auditor 404 checks the digital signature of the auditee 'C' 402. If the digital signature is valid, the metadata of the events 9-15 are stored in the auditing database 406. The auditee 'C' 402 can then generate auditing events 9-15. The auditor 404 will validate received events to ensure that they are permitted for the auditee 'C' 402 and that the events match the declared event structure. If the events are permitted for the auditee, then they are written to the auditing database 406. Invalid events are discarded and not written to the auditing database 406.

After expanding the framework 400, each auditee performs only events that are authorized for that auditee. For example, events 1-4 are performed by the auditee 'A' 408, events 5-8 are performed by the auditee 'B' 410, and events 9-15 can be performed by the auditee 'C' 402. Also, event details for each event are defined in the "AUDIT_EVENT_DETAILS" array and mandatory event details are defined in the "AUDIT_EVENTS" array. When an auditee fires an event, the auditing database 406 is checked to determine whether that event is authorized for that auditee. The auditing database 406 is also checked to determine whether mandatory event details are provided by an auditee. If an event is not authorized for that auditee or mandatory event details for that event are not provided, then that event is rejected and is not allowed to be entered in the auditing database 406. In one embodiment, an administrator can be informed that a particular auditee attempted to fire unauthorized events. In one embodiment, if an auditee server declares unauthorized or unapproved events, then the auditor rejects the events by writing an error in event log and not starting that auditee server.

The framework thus ensures that only authorized events for an auditee that includes the mandatory details are entered in the auditing database 406. This ensures consistency of event data in the auditing database 406. Reporting and interpretation of event data can be made easy and efficient by ensuring consistency. A reporting application can be associated with the auditing database 406 to provide analysis of the event data stored in the auditing database 406.

Figure 5:
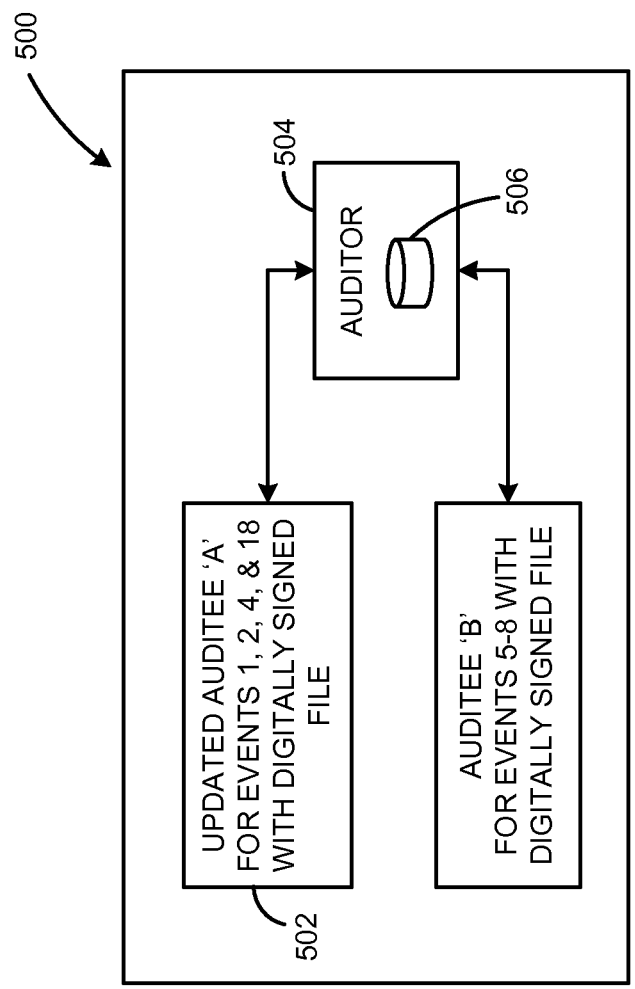
FIG. 5 is a block diagram of the event auditing framework that is expanded to include another new set of events, according to one embodiment.

Referring to FIG. 5, in one embodiment of the event auditing framework 500, a new auditee can be an update of an existing auditee. New events can be added for an existing auditee by providing an updated auditee with a newer version of a file containing the new events. In the updated auditee, some events of the existing auditee can be removed or some event details may be modified. For example, auditee 'A' (304 in FIG. 3) is authorized to perform events 1-4. An update of the auditee 'A' 502 can be provided to replace the event '3' with a new event '18.' In the updated auditee 'A' 502, event details of one or more events (e.g., events 1, 2, and 4) can also be modified. For example, new event details can be provided for the event '2' or mandatory event details can be removed or added. The updated auditee 'A' 502 is then registered with the auditor 504. The metadata of the updated auditee 'A' 502 is updated in the auditing database 506. The updated auditee 'A' 502 can then perform the events 1, 2, 4, and 18.

Several workflows can be used to implement the above described framework. The following is an example of a workflow for adding a new event to an auditee. An auditee product owner sends request to a central authority who is responsible for maintaining consistency of auditing events. The request can include details about what changes should be made to an auditee. For example, a new event "LOOK" with the event details "SIZE" and "DOCUMENT TYPE" can be requested. The central authority reviews the request and determines that a similar event "VIEW" already exists and therefore no new event is required. The central authority notifies auditee product owner about this. The Auditee product owner adds "VIEW" event to a file (e.g., DFO/DFT file) that include a list of events supported by the auditee. The file is sent to the central authority. The central authority reviews the file to ensure that it is consistent and correct. The file is electronically signed and sent back to the auditee product owner. The auditee product owner includes the file with their product. The file is shipped with the auditee and is automatically provided to an auditor when the auditee connects to that auditor for the first time.

The following is another example of a workflow for adding a new event to an auditee. Auditee product owner sends request to a central authority including details about what changes are required. For example, a new event "REFRESH" with the event details "SIZE" and "DOCUMENT TYPE" can be requested. The central authority reviews the request and determines that this new event is required and that name and event details do match consistency requirements. The auditee product owner is notified about this. Auditee product owner adds "REFRESH" event to the DFO file. The auditee product owner also includes all supported event details and mandatory event details. The files are sent to the central authority for signoff. The central authority reviews the files to ensure that they are consistent. The files are electronically signed and sent back to the auditee product owner. The auditee product owner can then use the files to expand the existing auditing subsystem of a BI system to include the new event "REFRESH."

The following is an example of workflow for allowing an auditee to fire an existing event. Auditee product owner sends request to a central authority describing required changes. For example, an auditee 'A' shall be capable to fire an existing event "REFRESH." The central authority reviews the request and determines to allow the auditee 'A' to fire REFRESH event. The auditee product owner is notified about approval. The auditee product owner adds "REFRESH" event to the DFO file. The file is sent to the central authority for signoff. The central authority reviews the files to ensure consistency and correctness. The files are electronically signed and sent back to the auditee product owner. The auditee product owner can then ship this file with their auditee (or update an existing auditee with this new version of file). The REFRESH event is an "existing" event because there are other auditees already using it. The REFRESH event is a new event for the auditee 'A', but not new for the auditor. Therefore, the above process is used to add capability to the auditee 'A' to fire the REFRESH event.

Figure 6:
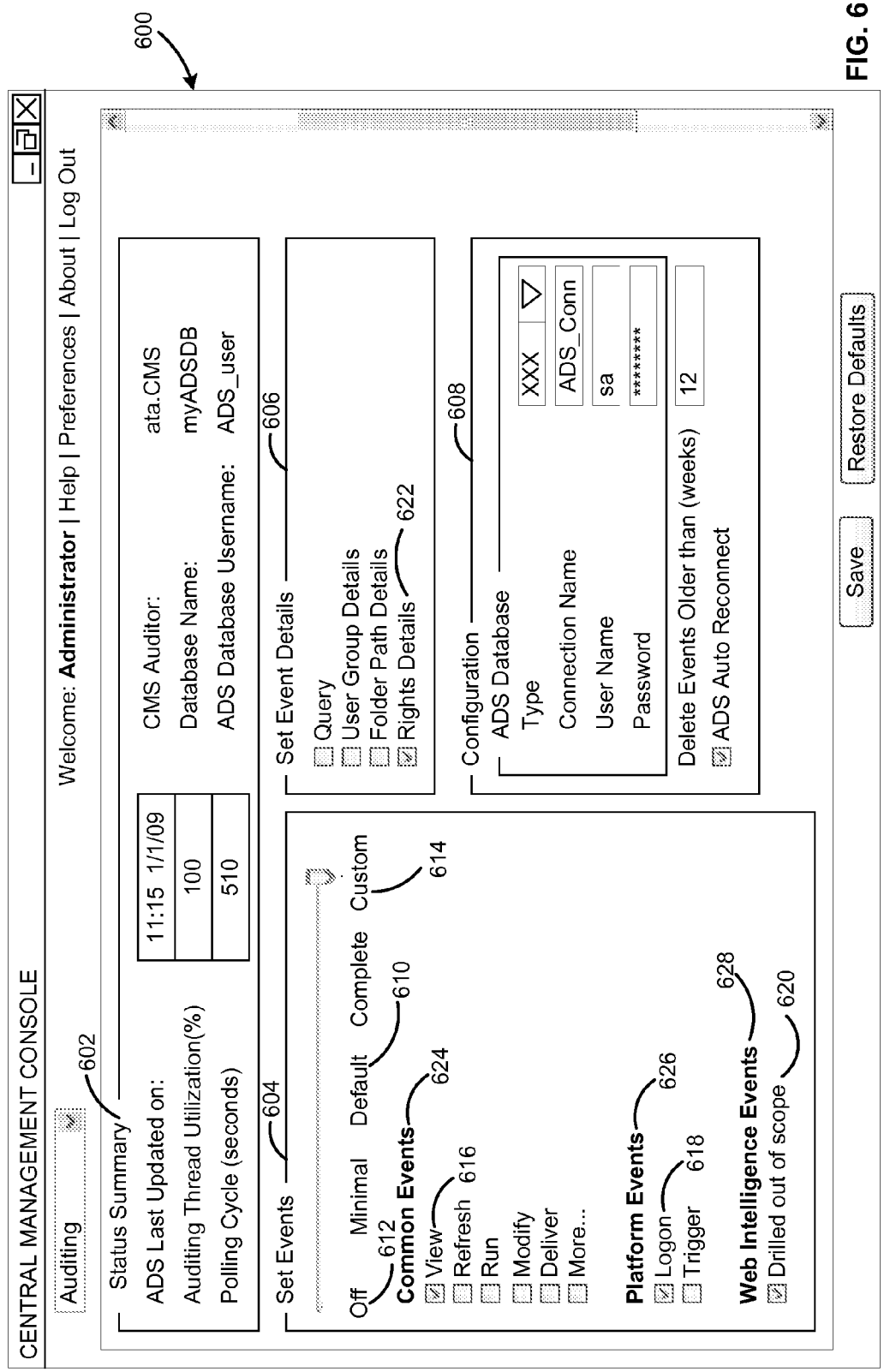
FIG. 6 is a block diagram of an auditing configuration user interface where an auditing level is selected, according to one embodiment.

Referring to FIG. 6, a user interface component 600 is provided to configure the auditing system and to display the authorized events. The user interface layout 600 can include a status section 602, set events section 604, set event details section 606, and a configuration section 608. Status summary and any warnings are displayed in the status section 602. Authorized events are shown in the set events section 604. Event details are displayed in the set event details section 606. The authorized events and event details are displayed after validation of digital signatures. Configuration properties are displayed in the configuration section 608.

Events that are not selected will not be generated. Only selected events will be allowed to be generated. In one embodiment, events can also be grouped into levels that are used to select which events the framework will generate. A data structure can be defined in such a way that the events, the event details, and the levels can be extended even after the release of the framework. An "AUDIT_LEVELS" array is used to describe levels that events are active in. The levels are used to help configure the auditing system. For example, there can be a "Default" level 610 that contains events that are to be performed when the auditing level is set to default. There can be an "Off" level 612 that will not contain any auditing events. When the "Off" level 612 is selected, none of the authorized events are performed. There can be a "Custom" level 614 with an ID number 'zero.' The "Custom" level 614 can be used to specify exactly what events are to be enabled. A configuring user can then select any of the events and event details. In the user interface 600, the events "View" 616, "Logon" 618, and "Drilled out of scope" 620 and the event detail "Rights Details" 622 are selected.

An example of "AUDIT_LEVEL" array is presented below in XML.

```
<array name="AUDIT_LEVELS">
    <arrayelement index="1" type="Bag">
        <property name="ID" type="Long">0</property>
        <property name="DESCRIPTION"
        type="String">Custom</property>
    </arrayelement>
    <arrayelement index="2">
        <property name="ID" type="Long">1</property>
        <property name="DESCRIPTION"
        type="String">Off</property>
    </arrayelement>
    <arrayelement index="3">
        <property name="ID" type="Long">2</property>
        <property name="DESCRIPTION"
        type="String">Minimal</property>
    </arrayelement>
</array>
```

The above array defines three levels. A "Custom" level is defined using the ID number '0.' The "Off" level is defined using the ID number "1." The ID number "2" corresponds to "Minimal" level. Similarly, IDs are used to define various other levels such as "Default" level and "Complete" level. Definition of each auditing level includes declaration of all auditing events belonging to it. For example, referring to "AUDIT_EVENTS" array that is previously presented, level IDs appear in the "AUDIT_LEVEL" property of the event definition.

The repository object that contains the events' definitions also contains the properties that define the current state of the auditing system, as shown below.

```
<property name="AUDIT_LEVEL" type="Long">3</property>
    <array name="ENABLED_AUDIT_EVENTS">
        <arrayelement name="1" type="Long">1001</arrayelement>
        <arrayelement name="2" type="Long">1002</arrayelement>
        ...
        <arrayelement name="15" type="Long">10004</arrayelement>
        <property name="TOTAL" type="Long">15</property>
    </array>
    <array name="ENABLED_AUDIT_EVENT_DETAILS">
        <arrayelement name="1" type="Long">1</arrayelement>
        <arrayelement name="2" type="Long">2</arrayelement>
        ...
        <arrayelement name="15" type="Long">21</arrayelement>
        <property name="TOTAL" type="Long">15</property>
    </array>
```

The "AUDIT_LEVEL" property contains the level number that controls which events will be performed. The "ENABLED_AUDIT_EVENTS" contains a list of the event IDs that are enabled in the current level. The auditing system will perform the events in this list. If the "AUDIT_LEVEL" is set to zero (the custom level), then the "ENABLED_AUDIT_EVENTS" list will contain the events selected by the user. If the "AUDIT_LEVEL" is set to any other level, then the "ENABLED_AUDIT_EVENTS" list will include events that are defined in the XML file for this level. The "ENABLED_AUDIT_EVENT_DETAILS" is used to turn off event details that are time consuming to calculate. The auditing framework generates that event detail if an event detail is in this list. As with the new events and new event details, new auditing levels can be added even after the framework is released. The process is similar to the process used for new events, i.e. by creating a new auditee or an update of an existing auditee with a file (e.g., DFO) defining a new level and registering that auditee with the auditor. The new level will then appear in the user interface component.

Auditing events can also be divided into different categories. For example, audit events can be categorized into core or common events 624 that can be generated by any auditee, platform events 626 that can be generated by specific platform components (e.g., BI platform), and WebIntelligence (WebI) specific events 628 that can be generated only by WebI auditees. An example of an auditing event category "Platform events" 626 having an ID 5 is shown below.

```
<propertybag name="SI_AUDIT_CATEGORIES" type="Bag" flags="0" version="3">
<propertybag name="1" type="Bag" flags="0" payload="true">
<property name="SI_ID" type="Long" flags="0" key="true">5</property>
<property name="SI_DESCRIPTION" type="String" flags="0">
Platform events
</property>
<propertybag name="SI_ML_DESCRIPTION" type="Bag" flags="0">
<property name="EN" type="String" flags="0"> Platform events
</property>
</propertybag>
</propertybag>
<property name="SI_TOTAL" type="Long" flags="0">1</property>
</propertybag>
```

Similarly, each category has an ID. The IDs of the categories appear in the AUDIT_CATEGORY property of the event definition, i.e. the AUDIT_EVENTS array that is described previously. Each event belongs to only one category.

Figure 7:
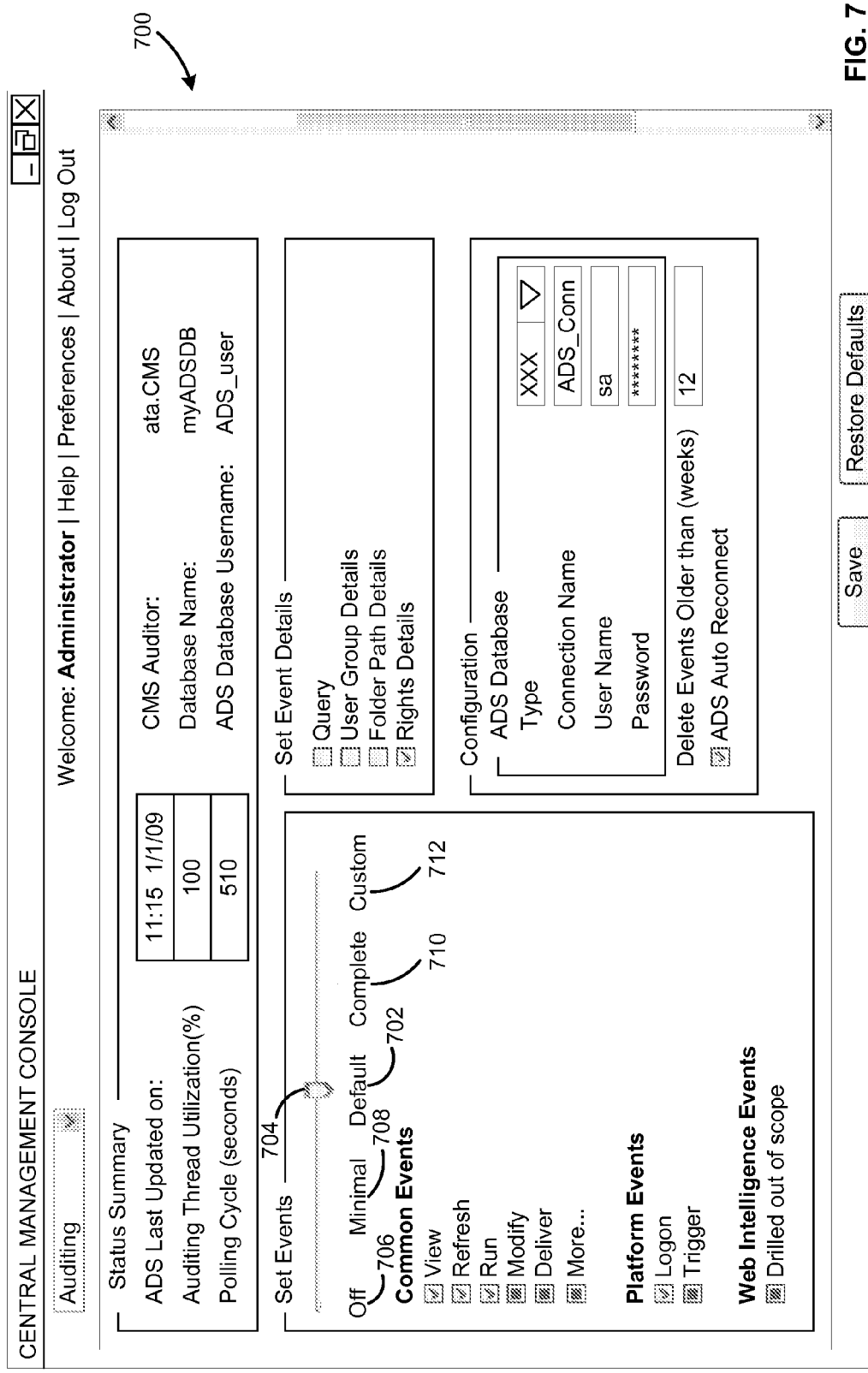
FIG. 7 is a block diagram of an auditing configuration user interface where another auditing level is selected, according to one embodiment.

FIG. 7 illustrates a block diagram of a user interface 700 where "Default" level 702 is selected as the audit level. An option such as a slider 704 can be provided on the user interface 700 to select the audit level. Five levels, namely, Default level 702, Off level 706, Minimal level 708, Complete level 710, and Custom level 712 are provided. A user can drag the slider 704 to select the level. Consider that the ID number of Default level 702 is included in the event definitions of the "View," "Refresh," "Run," and "Logon" event. Therefore, if the Default level 702 is selected, the events "View," "Refresh," "Run," and "Logon" are then checked in their respective check boxes. The auditing framework is now configured to perform the "View," "Refresh," "Run," and "Logon" events. Similarly, if the "Complete" level 710 is selected, all the auditing events are checked. Minimal level 708 enables only "Logon" events.

In one embodiment, in order to support configuration of the framework, events and events details can be grouped. Pseudo details and groups can be defined as below.

```
<array name="AUDIT_EVENT_DETAILS">
    ...
    <propertybag name="28" type="Bag">
        <property name="ID" type="Long">29</property>
        <property name="IS_SETTABLE" type="Bool">false</property>
        <property name="DESCRIPTION" type="String">Property Value</property>
    </propertybag>
    <propertybag name="33" type="Bag">
```

```
        <property name="ID" type="Long">39</property>
        <property name="IS_SETTABLE" type="Bool">false</property>
        <property name="DESCRIPTION" type="String">Property Color</property>
    </propertybag>
    ...
    <arrayelement name="63">
        <property name="ID" type="Long">80</property>
        <property name="IS_SETTABLE" type="Bool">true</property>
        <property name="DESCRIPTION" type="String">Property Value Details</property>
        <array name="MEMBERS" type="Bag">
            <arrayelement name="1" type="Long">29</arrayelement>
            <arrayelement name="2" type="Long">39</arrayelement>
            <property name="TOTAL" type="Long">2</property>
        </array>
    </arrayelement>
</array>
```

The above example of an array defines a detail called "Property Value" with ID number 29. The "IS_SETTABLE" property is set to "False" to indicate the user interface should not show the detail. A detail group called "Property Value Details" with ID number 80 is also defined. The "IS_SETTABLE" property is set to "True" to indicate that the user interface should allow the detail to be settable. Settable means that the "DISABLED_AUDIT_DETAILS" property may be updated. When a group is enabled or disabled, the state is updated as if the value in MEMBERS were updated. For example, when a user enables "Property Value Details" event detail, "Property Details" and "Property Color" event details are enabled. Similarly, "Property Details" and "Property Color" event details are disabled when "Property Value Details" event detail is disabled.

When a new auditee registers with the auditor, it provides a digitally signed file with events definition. If the digital signature is correct then the auditor will add new or updated definitions of events, event details, event levels, and categories to the auditing database from the file. This file contains a digital signature for the values of the AUDIT_EVENTS, AUDIT_EVENT_DETAILS, AUDIT_LEVELS, and AUDIT_CATEGORY arrays. If the digital signature is not correct, then the update will not be loaded.

An auditor will receive events from auditees and validates the received events based on the metadata stored in the auditing database after verification of digital signature. The auditor validates the structure of a received event as specified in the corresponding metadata stored in the auditing database. In one embodiment, an auditing configuration object in the auditing database can be used to validate the events. If the received event does not appear in the AUDIT_EVENTS list then that event will be rejected. If the received event contains details that are not in the SUPPORTED_EVENT_DETAILS array then the event will be rejected. If the received event does not include details as provided in the MANDATORY_EVENT_DETAIL array it will be rejected. If an event and its details appear in a respective array, the event will be accepted as a valid event and saved in the audit log. The auditees will query the auditing database for the auditing configuration object. The auditee checks the ENABLED_AUDIT_EVENTS array to determine which events are generated. Because the configuration object is retrieved from the auditing database and not hard-coded in the source, the auditing framework is extensible. Also, it can be noted that events are authorized per auditee. If event 1 is authorized for auditee 'A' and not for auditee 'B', only auditee 'A' can generate event 1 and auditee 'B' is not permitted to generate event 1.

The user interface component will also query for the auditing configuration object. All events that are in the AUDIT_EVENTS array will be settable in the user interface unless the IS_SETTABLE property is false. The AUDIT_LEVEL property can be used to determine which events are currently enabled. The user interface can update the ENABLED_AUDIT_EVENTS property in the auditing configuration object to change which events are enabled. The user interface will have similar behavior for the ENABLED_AUDIT_EVENT_DETAILS property.

Figure 8:
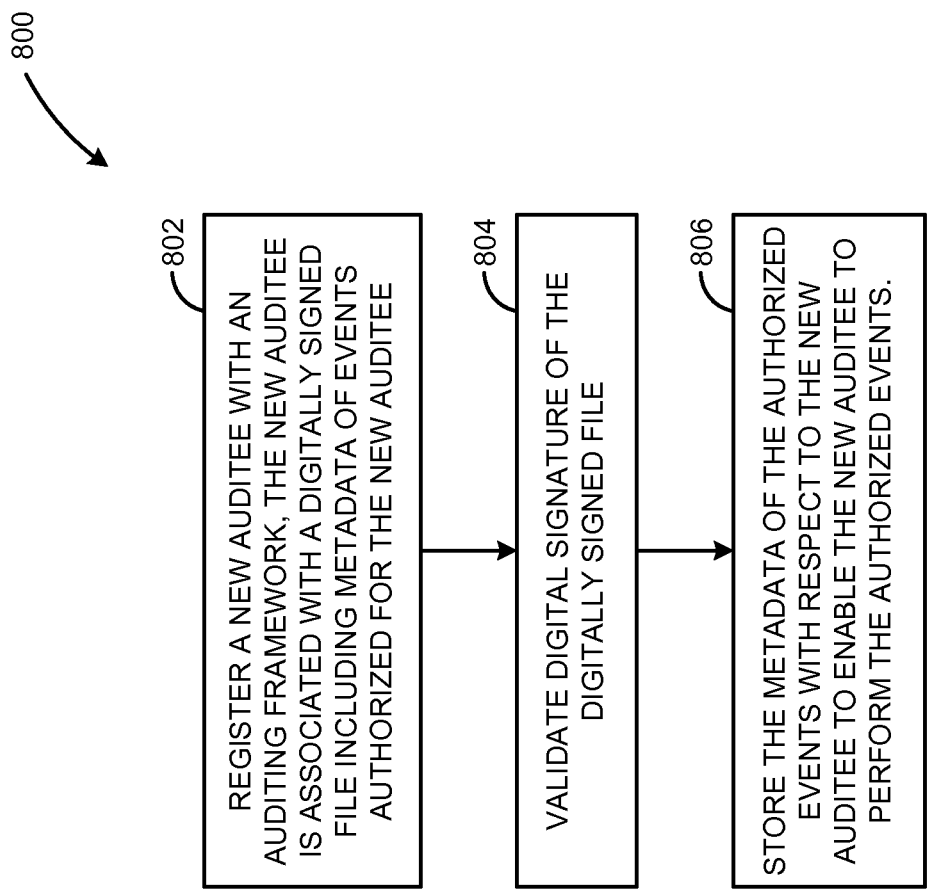
FIG. 8 is a block diagram of an event auditing method, according to one embodiment.

FIG. 8 illustrates an embodiment of the event auditing method. At 802, a new auditee is registered with an auditing framework. The auditing framework includes an auditor and an auditing database associated with the auditor. The new auditee is associated with a digitally signed file. The digitally signed file includes metadata of one or more events authorized for the new auditee. At 804, after registering the new auditee, digital signature of the file is validated. At 806, the metadata of the authorized events is stored with respect to the new auditee if the digital signature is valid. The metadata is stored in the auditing database. This enables the new auditee to perform the authorized events. Based on the metadata stored in the auditing database, the auditor permits an auditee to perform those events that are authorized for that auditee. The framework rejects any event that is not part of the authorized events. The framework also rejects an event that does not include mandatory event details.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
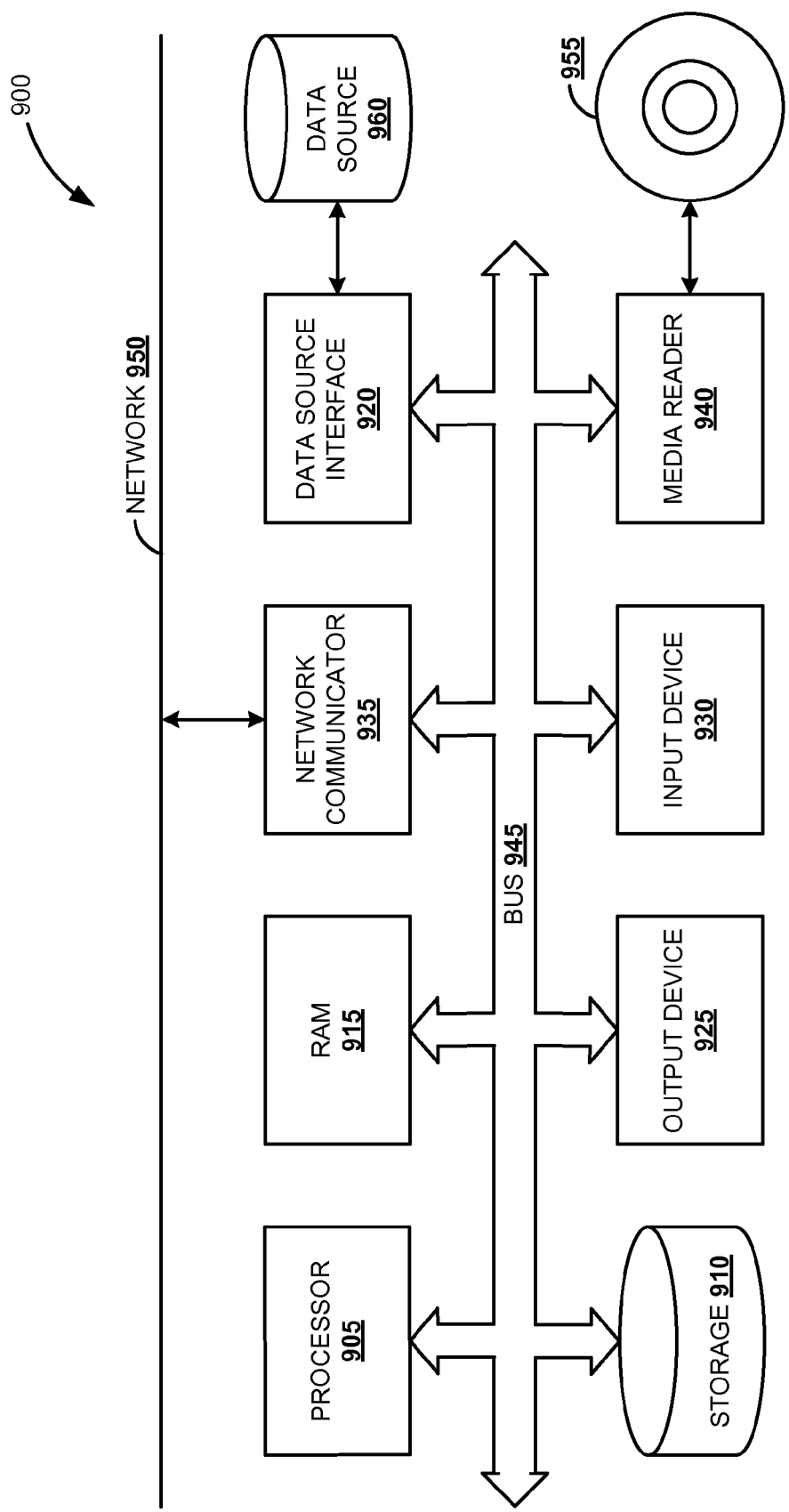
FIG. 9 is a block diagram of an exemplary computer system according to one embodiment.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a computer readable storage medium to tangibly store instructions, which when executed by a computer, cause the computer to:
   register a new auditee with an auditing framework comprising an auditor and an auditing database, wherein the new auditee is associated with a digitally signed file including metadata of one or more events authorized for the new auditee;
   validate digital signature of the file; and
   when the digital signature is valid, store the metadata of the authorized events with respect to the new auditee in the auditing database to enable the new auditee to perform the authorized events.

2. The article of manufacture of claim 1, further comprising instructions which when executed by the computer further causes the computer to:
   display the authorized events on a user interface.

3. The article of manufacture of claim 1, wherein the metadata comprises details of the authorized events of the new auditee.

4. The article of manufacture of claim 3, wherein the metadata further comprises one or more categories to which the events belong to and one or more audit levels to which the events correspond to.

5. The article of manufacture of claim 1, wherein the new auditee is an update of an existing auditee.

6. The article of manufacture of claim 1, wherein the metadata comprises mandatory details and supported details of the authorized events.

7. The article of manufacture of claim 6, further comprising instructions which when executed by the computer further causes the computer to:
   reject an event that does not include mandatory details.

8. The article of manufacture of claim 1, further comprising instructions which when executed by the computer further causes the computer to:
   reject an event from a particular auditee when that event is not authorized for that particular auditee.

9. A computer-implemented event auditing framework, comprising:
   one or more auditee components, wherein an auditee component is associated with a digitally signed file including metadata of one or more events authorized for the auditee component;
   an auditor to validate digital signature of the file when the auditee component is registered with the auditor; and
   a memory associated with the auditor to store the metadata of the authorized events with respect to the auditee component after validation of the digital signature to enable the auditee component to perform the authorized events.

10. The event auditing framework of claim 9, further comprising:
    a user interface component for displaying the authorized events and configuring the event auditing framework.

11. The event auditing framework of claim 10, wherein the metadata comprises details of the authorized events of the auditee components, one or more categories to which the events belong to, and one or more audit levels to which the events correspond to.

12. The event auditing framework of claim 11, wherein the user interface component includes an option to select the audit level.

13. The event auditing framework of claim 9, wherein the auditor validates a received event to ensure that the received event matches structure as specified in the metadata stored in the memory.

14. The event auditing framework of claim 9, wherein the metadata comprises mandatory details and supported details of the authorized events.

15. The event auditing framework of claim 14, wherein the auditor rejects an event that does not include mandatory details.

16. The event auditing framework of claim 9, wherein the auditor rejects an event from a particular auditee component when that event is not authorized for that particular auditee component.

17. A computer-implemented method for event auditing, the method comprising:
    registering a new auditee with an auditing framework comprising an auditor and an auditing database, wherein the new auditee is associated with a digitally signed file including metadata of one or more events authorized for the new auditee;
    validating digital signature of the file; and
    when the digital signature is valid, store the metadata of the authorized events with respect to the new auditee in the auditing database to enable the new auditee to perform the authorized events.

18. The method of claim 17, further comprising:
    displaying the authorized events on a user interface.

19. The method of claim 17, wherein the metadata comprises details of the authorized events of the new auditee.

20. The method of claim 19, wherein the metadata further comprises one or more categories to which the events belong to and one or more audit levels to which the events correspond to.

21. The method of claim 17, wherein the new auditee is an update of an existing auditee.

22. The method of claim 17, wherein the metadata comprises mandatory details and supported details of the authorized events.

23. The method of claim 22, further comprising:
    rejecting an event that does not include mandatory details.

24. The method of claim 17, further comprising:
    rejecting an event from a particular auditee when that event is not authorized for that particular auditee.

* * * * *